United States Patent [19]

Imaeda

[11] Patent Number: 4,987,353
[45] Date of Patent: Jan. 22, 1991

[54] CURRENT SWITCHING DEVICE FOR MOTOR

[75] Inventor: Hirofumi Imaeda, Hamamatsu, Japan

[73] Assignee: Sanshin Kogyo Kabushiki Kaisha, Hamamatsu, Japan

[21] Appl. No.: 343,905

[22] Filed: Apr. 26, 1989

[30] Foreign Application Priority Data

Apr. 27, 1988 [JP] Japan .................. 63-105250

[51] Int. Cl.$^5$ .............................................. H02P 1/22
[52] U.S. Cl. ..................... 318/293; 318/280; 440/53
[58] Field of Search ............... 318/280, 287, 291, 293, 318/294; 440/6, 53

[56] References Cited

U.S. PATENT DOCUMENTS

| | | | |
|---|---|---|---|
| 1,732,711 | 10/1929 | Boddie | 318/293 X |
| 2,629,849 | 2/1953 | Barnes | 318/293 X |
| 2,630,554 | 3/1953 | Kuka | 318/293 X |
| 3,064,172 | 11/1962 | Young et al. | 318/293 |
| 3,290,575 | 12/1966 | Modiano | 318/293 X |
| 3,684,945 | 8/1972 | Hermansson et al. | 318/293 X |

*Primary Examiner*—Bentsu Ro
*Attorney, Agent, or Firm*—Ernest A. Beutler

[57] ABSTRACT

A tilt and trim operating mechanism for a marine outboard drive including a simplified electrical arrangement for operating a reversible electric motor from a DC power source. The circuitry includes four relay switches operated in such a manner as to simplify the cost of the components since four double contact relays can be employed rather than two, three contact relays.

7 Claims, 2 Drawing Sheets

CURRENT SWITCHING DEVICE FOR MOTOR

BACKGROUND OF THE INVENTION

This invention relates to a current switching device for a motor and more particularly to an improved control for a reversible DC electric motor.

Direct current electrical motors that offer reversible operation are used for a wide variety of purposes. For example, such motors are employed frequently in marine propulsion devices for driving a reversible fluid pump to operate the tilt and trim mechanism of the outboard drive. As such, the electric motor is selectively energized from a battery for rotation in either forward or reverse direction to raise or lower the outboard drive. Normally, fairly high current loadings are transmitted and it has been the practice to employ a pair of three contact electrical relays for controlling the circuitry between the battery and the electric motor in response to the operator controlled switch. However, such electrical devices as three contact relays are quite expensive when transmitting such high powers.

It is, therefore, a principal object of this invention to provide an improved high capacity switching device for a reversible electric motor that permits the use of relatively low cost electrical components.

It is a further object of this invention to provide an improved simplified and low cost arrangement for switching an electric motor between forward and reverse operation.

It is a further object of this invention to provide an improved low cost switching device for a reversible fluid pump for an outboard drive tilt and trim unit.

SUMMARY OF THE INVENTION

This invention is adapted to be embodied in a switch arrangement for operating a reversible electric motor in either direction from a source of direct current. A master switch is incorporated that is movable between a neutral position, a forward position and a reverse position. First and second relays have their windings in parallel circuit with a first terminal of the master switch for energization when the master switch is switched in the forward position. The contacts of the first and second relays are in circuit with the source and the electric motor for effecting energization of the electric motor in a forward direction when the first and second relays are energized. Third and fourth relays are provided that have their windings in parallel circuits with a second terminal of the master switch for energization when the master switch is switched to its reverse position. The contacts of the third and fourth relays are in circuit with the source and the motor for effecting energization of the motor in a reverse direction when the third and fourth relays are energized.

DETAILED DESCRIPTION OF THE PREFERRED EMBODIMENT

Figure 1:
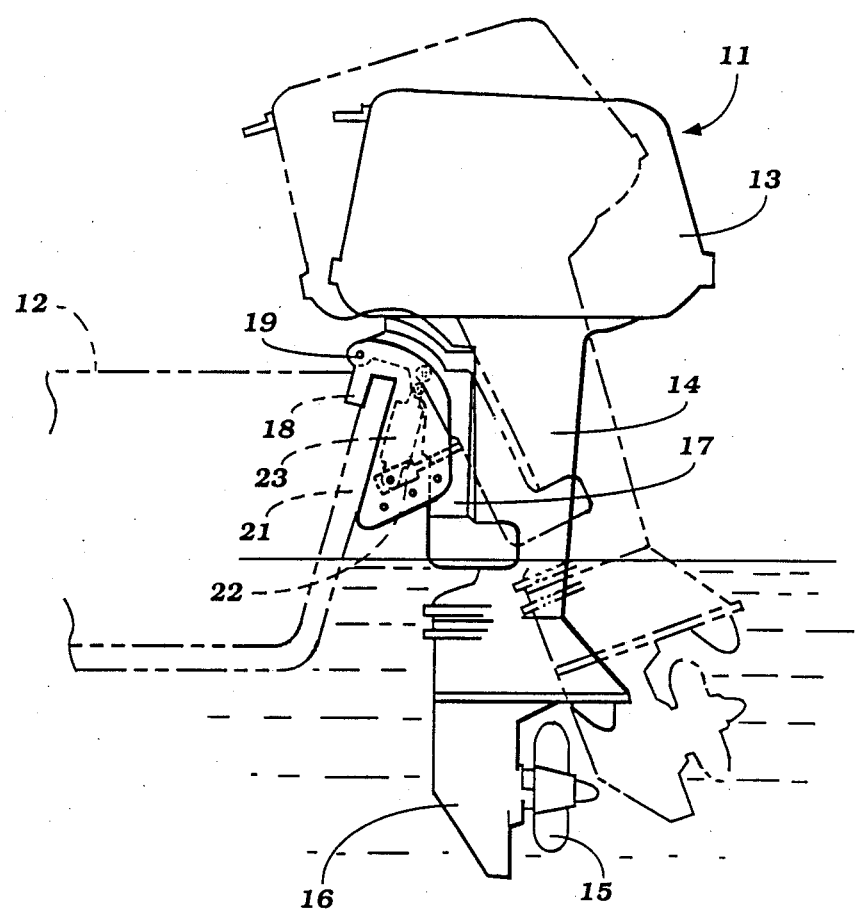
FIG. 1 is a side elevational view of an outboard motor as attached to the transom of an associated watercraft which is shown partially and in phantom.

Referring first in detail to FIG. 1, there is illustrated a typical environment in which the invention may be utilized. A marine outboard drive in the form of an outboard motor is identified generally by the reference numeral 11 and is shown attached to the transom of a watercraft, shown partially in phantom and identified generally by the reference numeral 12. The outboard motor 11 is comprised of a power head 13 that consists of a powering internal combustion engine of any type (not shown) and which is contained within a protective cowling. The engine drives a drive shaft (not shown) that is journaled for rotation in a drive shaft housing 14 that depends from the power head 13. This drive shaft is adapted to selectively drive a propeller 15 of a lower unit 16 in selected forward and reverse directions by means of a conventional forward, neutral, reverse transmission contained within the lower unit and not illustrated because its construction forms no part of the invention.

A steering shaft (not shown) is affixed to the drive shaft housing 14 and is journaled for steering movement within a swivel bracket 17 for steering of the outboard motor 11. The swivel bracket 17 is pivotally connected to a clamping bracket 18 by means of a pivot pin 19 for tilt and trim movement in a manner to be described. The clamping bracket 18 carries a clamping device for affixing the outboard motor 11 to a transom 21 of the watercraft 12 in a known manner.

The trim adjustment of the outboard motor 11 is controlled by a trim cylinder 22 which is a hydraulically actuated cylinder that is affixed in a suitable manner to the clamping bracket 18 and which bears against the swivel bracket 17 for effecting its pivotal movement about the pivot pin 19. In addition, a tilt fluid cylinder 23 is interconnected between the clamping bracket 18 and the swivel bracket 17 for tilting the outboard motor 11 up to an out of the water condition.

The construction of the outboard motor 11, its association with the watercraft 12, and the tilt and trim mechanism as thus far described may be considered to be conventional. For that reason, detailed description of these components is not believed to be necessary in order to understand the construction and operation of the invention which will not be described by particular reference to FIG. 2.

The hydraulic system for the tilt cylinder 23 and trim cylinder 22 is shown schematically in this figure and is identified generally by the reference numeral 24. This actuating mechanism includes a reversible hydraulic pump that is driven by a reversible DC electric motor shown schematically at 25. The particularly hydraulic circuitry and fluid motor associated with the tilt cylinder 23 and trim cylinder 22 forms no part of the invention and, for that reason, this construction also has not been illustrated. Any conventional construction may be utilized for this purpose.

The invention deals with the manner and structure for operating the electric motor 25 for driving it in selected forward or reverse directions and this mechanism will now be described in detail.

Figure 2:
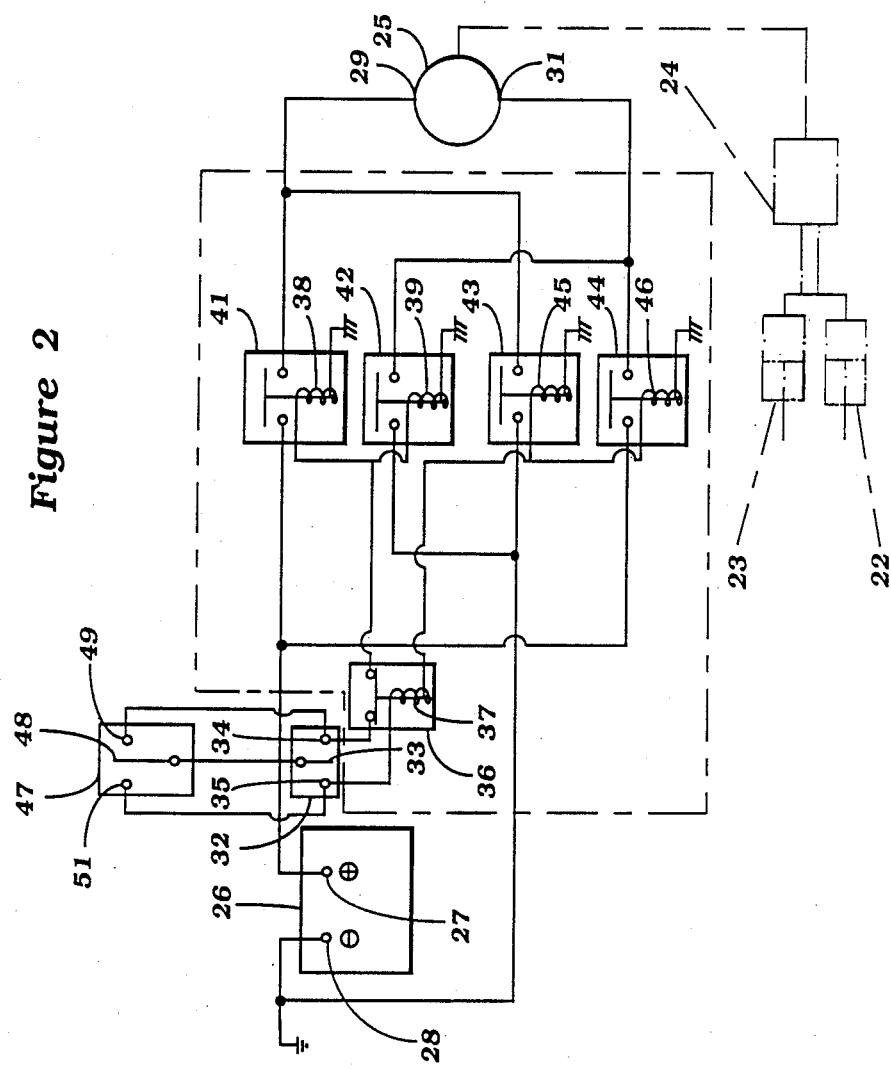
FIG. 2 is a schematic electrical diagram showing the operation of the tilt and trim unit associated with the outboard drive illustrated in FIG. 1.

As shown in FIG. 2, there is provided a DC power source in the form of a storage battery 26 having a positive terminal 27 and a negative terminal 28. The electric motor 25 has a pair of terminals 29 and 31. When the terminal 29 experiences a positive charge and the terminal 31 is connected to the negative terminal of the battery 26, the motor 25 will be driven in a forward direction. On the other hand, when the terminal 31 is positive and the terminal 29 is negative, the motor 25 will be driven in reverse.

The selected forward and reverse directions are controlled by means of a master switch 32 having a movable contact 33 that is adapted to selectively engage either a forward terminal 34 or a reverse terminal 35. The forward terminal 34 is in circuit with one conductor of a normally closed relay operated switch 36 having a solenoid winding 37. The winding 37 is in contact with the reverse terminal 35 so that when the reverse terminal 35 is energized, the solenoid 37 will be energized and the switch 36 will be opened.

The other contact of the switch 36 is in parallel circuit with a pair of windings or solenoids 38 and 39 of first and second relay operated switches 41 and 42, respectively. The switch 41 has one of its contacts in circuit with the positive side 27 of the battery 26 and its other contact in circuit with the terminal 29 of the electric motor 25. The solenoid switch 42 has one of its contacts in circuit with the negative terminal 28 of the battery 26. The other contact of this solenoid switch 42 is in circuit with the terminal 31 of the motor 25.

The solenoid switches 41 and 42 are normally open and when they are energized by the movement of the movable contact 33 into contact with the terminal 34 of the master switch 32, the solenoid windings 38 and 39 will be energized and the terminal 29 of the electric motor 25 will be in circuit with the positive terminal 27 of the battery and the terminal 31 of the motor 25 will be in circuit with the negative terminal 28 of the battery and the motor 25 will be driven in forward direction.

There are further provided a third relay switch 43 and fourth relay switch 44 which have respective solenoid windings 45 and 46. The solenoid winding 37 of the relay switch 36 is in parallel circuit with the windings 45 and 46 of the relay switches 43 and 44 and is connected to ground through these switches. Therefore, when the master control switch 32 has its movable contact 33 moved to close the contact with the terminal 35, the solenoid windings 37, 45 and 46 will all be energized. This will cause the normally opened switches 43 and 44 to be closed. The connection to the solenoid windings 38 and 39 of the switches 41 and 42 is opened.

The solenoid switch 43 has one of its terminals in circuit with the negative terminal 28 of the battery 26 and its other contact in circuit with the terminal 29 of the electric motor 25. Therefore, when the solenoid switch 43 is closed, the terminal 29 of the motor 25 will be connected to the negative terminal 28 of the battery 26. One terminal of the solenoid switch 46 is in circuit with the positive terminal 27 of the battery 26 and its other terminal is in circuit with the terminal 31 of the electric motor 25. Accordingly, when the solenoid switch 44 is closed, the terminal 31 of the electric motor 25 will be in circuit with the positive terminal 25 of the battery 26 and the electric motor 25 will be driven in its reverse direction.

It should be apparent from the foregoing description, therefore, that the use of four, double terminal solenoid switches will achieve the same purposes as the use of two, three terminal relays as previously employed and, accordingly, much lower cost electrical components can be used.

As is conventional with many watercraft, there is further provided a remote switch 47 for remotely operating the tilt and trim system. The remote switch 47 has a movable contact 48 and a pair of terminals 49 and 51 that are in parallel circuits with the terminals 37 and 35 of the main switch 32. As a result, if the main switch 32 is not operated, the remote switch 47 may be utilized to achieve either forward or reverse direction of the electric motor 25 in the manner already described.

Since the relay switch 36 is interposed between the terminals 34 and 35 of the main switch 32 and the windings of the respective solenoids 38, 39, 45 and 46 of the relay switches 41, 42, 43 and 44 and since the relay switch 36 is normally closed, in the event both sWitches 47 and 32 are operated in different senses, the relay switches 43 and 44 will be acted on in priority and the motor 25 will be driven in the reverse or down direction for safety purposes.

It should be readily apparent from the foregoing description that the described embodiment of the invention provides a very effective and low cost control for a reversible electric motor. Although an embodiment of the invention has been illustrated and described, various changes and modifications may be made without departing from the spirit and scope of the invention, as defined by the appended claims.

I claim:

1. A marine outboard drive adapted to be mounted on the transom of a watercraft for tilt and trim movement relative thereto, fluid motor means to be interposed between said transom and said outboard drive for controlling the trim and tilt condition thereof, a reversible fluid pump, fluid circuits means interconnects said reversible fluid pump with said fluid motor means for operating said fluid motor means for controlling the tilt and trim condition of said marine outboard drive, a reversible electric motor for driving said reversible fluid pump in selected forward and reverse directions, and a switch arrangement for operating said reversible electric motor in either direction from a source of direct current, said switch arrangement comprising a master switch movable between a neutral position, a forward position, and a reverse position, first and second relays each having respective windings connected in parallel circuit with a first terminal of said master switch for energization when said master switch is switched to its forward position, the contacts of said first and said second relays being connected in circuit with said source and said motor for effecting energization of said motor in a forward direction when said first and said second relay windings are energized, third and fourth relays each having respective windings connected in parallel circuit with a second terminal of said master switch for energization when said master switch is switched to its reverse position, the contacts of said third and fourth relays being connected in circuit with said source and said motor for effecting energization of said motor in a reverse direction when said third and said fourth relay windings are energized.

2. A switch arrangement as set forth in claim 1 further including additional relay means connected in circuit between the master switch and the first, second, third and fourth relays.

3. A switch arrangement as set forth in claim 2 wherein the additional relay means comprises a single relay having its contacts connected in series circuit with the first terminal of the master switch and connected in parallel circuit with the windings of the first and second relays and its winding connected in parallel circuit with the windings of the third and fourth relays and connected in series circuit with the second terminal of the master switch.

4. A switch arrangement as set forth in claim 1 further including a second switch having first and second terminals connected in parallel circuit with the first and second terminals, respective, of the master switch for remote operation of the electric motor.

5. A switch arrangement as set forth in claim 4 further including additional relay means in circuit between the master switch and the first, second, third and fourth relays.

6. A switch arrangement as set forth in claim 5 wherein the additional relay means comprises a single relay having its contacts connected in series circuit with the first terminal of the master switch and connected in parallel circuit with the windings of the first and second relays and its winding connected in series circuit with the second terminal of the master switch.

7. A switch arrangement as set forth in claim 6 wherein the additional relay means is normally closed so that the motor is driven in a reverse direction in the event the master switch and the remote switch are switched into opposite conditions.

* * * * *